United States Patent
Freeman et al.

(10) Patent No.: US 9,323,836 B2
(45) Date of Patent: Apr. 26, 2016

(54) INTERNET BASED METHOD AND SYSTEM FOR RANKING ARTISTS USING A POPULARITY PROFILE

(75) Inventors: Duncan Freeman, Atlanta, GA (US); John Edward Elmore, Atlanta, GA (US)

(73) Assignee: Popular Metrics, Inc., Atlanta, GA (US)

( * ) Notice: Subject to any disclaimer, the term of this patent is extended or adjusted under 35 U.S.C. 154(b) by 644 days.

(21) Appl. No.: 12/322,625

(22) Filed: Feb. 4, 2009

(65) Prior Publication Data

US 2010/0121857 A1 May 13, 2010

Related U.S. Application Data

(60) Provisional application No. 61/065,284, filed on Feb. 11, 2008.

(51) Int. Cl.
*G06F 7/00* (2006.01)
*G06F 17/30* (2006.01)

(52) U.S. Cl.
CPC .................. *G06F 17/30702* (2013.01)

(58) Field of Classification Search
CPC ................... G06F 17/30864; G06F 17/30867; G06Q 30/02
USPC ......................................................... 707/723
See application file for complete search history.

(56) References Cited

U.S. PATENT DOCUMENTS

| | | | |
|---|---|---|---|
| 6,117,011 A | 9/2000 | Lvov | |
| 6,241,608 B1 | 6/2001 | Torango | |
| 6,364,767 B1 | 4/2002 | Brossard et al. | |
| 7,548,915 B2 * | 6/2009 | Ramer et al. | 705/14.54 |
| 7,647,330 B2 | 1/2010 | Rieffanaugh, Jr. | |
| 8,005,856 B2 | 8/2011 | Spitzer-Williams et al. | |
| 8,015,123 B2 | 9/2011 | Barton et al. | |
| 8,166,029 B2 | 4/2012 | Park et al. | |
| 8,221,225 B2 | 7/2012 | Laut | |
| 8,255,488 B2 | 8/2012 | Tanaka et al. | |
| 8,417,713 B1 * | 4/2013 | Blair-Goldensohn | G06F 17/30699 705/347 |
| 9,122,749 B2 | 9/2015 | Elmore et al. | |
| 2004/0153389 A1 | 8/2004 | Lortscher | |
| 2005/0003878 A1 | 1/2005 | Updike | |
| 2005/0075164 A1 | 4/2005 | Krynicky | |
| 2006/0031483 A1 * | 2/2006 | Lund | G06Q 10/107 709/224 |
| 2006/0063580 A1 | 3/2006 | Nguyen et al. | |
| 2006/0211465 A1 | 9/2006 | Moshal | |
| 2007/0016599 A1 * | 1/2007 | Plastina | G11B 27/031 |
| 2007/0088727 A1 | 4/2007 | Kindig | |

(Continued)

OTHER PUBLICATIONS

Elmore, John; Final Office Action for U.S. Appl. No. 12/927,030, filed Nov. 15, 2010, mailed May 9, 2012, 12 ps.

(Continued)

*Primary Examiner* — Azam Cheema
(74) *Attorney, Agent, or Firm* — Taylor English Duma LLP

(57) ABSTRACT

A set of data pertaining to artists and other content creators is retrieved periodically from various Internet-connected sources, the data being characterized as both quantitative and qualitative data. The data is analyzed through various means, including sentiment analysis, to produce quantitative information, including a score or set of scores, that is descriptive of an artist's popularity as well as the ranking of an artist among other artists within a category or set of categories.

14 Claims, 8 Drawing Sheets

(56) References Cited

U.S. PATENT DOCUMENTS

| | | | |
|---|---|---|---|
| 2007/0173309 A1 | 7/2007 | Rigsby | |
| 2008/0040235 A1 | 2/2008 | Avedissian | |
| 2008/0062318 A1 | 3/2008 | Ellis et al. | |
| 2008/0076504 A1 | 3/2008 | Jenkins | |
| 2008/0182563 A1 | 7/2008 | Wugofski et al. | |
| 2008/0228511 A1 | 9/2008 | Barden | |
| 2008/0257134 A1* | 10/2008 | Oppenheimer ... | G06F 17/30772 84/609 |
| 2008/0288326 A1 | 11/2008 | Abramowicz | |
| 2009/0117969 A1 | 5/2009 | Englman | |
| 2009/0182725 A1* | 7/2009 | Govani ............... | G06F 17/3053 |
| 2009/0186679 A1 | 7/2009 | Irvine et al. | |
| 2009/0325715 A1 | 12/2009 | Kelly et al. | |
| 2010/0041482 A1 | 2/2010 | Kumar et al. | |
| 2010/0048302 A1 | 2/2010 | Lutnick et al. | |
| 2010/0121857 A1 | 5/2010 | Elmore et al. | |
| 2010/0198584 A1 | 8/2010 | Habu et al. | |
| 2010/0203938 A1 | 8/2010 | Alderucci et al. | |
| 2010/0241723 A1 | 9/2010 | Dornbush | |
| 2011/0045911 A1 | 2/2011 | Parham | |
| 2011/0055223 A1 | 3/2011 | Elmore et al. | |
| 2011/0077075 A1 | 3/2011 | Aaron | |
| 2011/0256925 A1 | 10/2011 | Schipani et al. | |
| 2011/0295577 A1 | 12/2011 | Ramachandran | |
| 2012/0058813 A1 | 3/2012 | Amaitis et al. | |
| 2013/0090157 A1 | 4/2013 | Tharp | |
| 2013/0116032 A1 | 5/2013 | Lutnick | |

OTHER PUBLICATIONS

Elmore, John; Final Office Action for U.S. Appl. No. 12/927,030, filed Nov. 5, 2010, mailed Sep. 29, 2014, 14 pgs.

Elmore, John; Issue Notification for U.S. Appl. No. 12/927,030, filed Nov. 5, 2010, mailed Aug. 12, 2015, 1 pg.

Elmore, John; Non-Final Office Action for U.S. Appl. No. 12/927,030, filed Nov. 5, 2010, mailed Jan. 27, 2012, 11 pgs.

Elmore, John; Non-Final Office Action for U.S. Appl. No. 12/927,030, filed Nov. 5, 2010, mailed Dec. 27, 2012, 11 pgs.

Elmore, John; Non-Final Office Action for U.S. Appl. No. 12/927,030, filed Nov. 5, 2010, mailed Sep. 4, 2013, 13 pgs.

Elmore, John; Notice of Allowance for U.S. Appl. No. 12/927,030, filed Nov. 5, 2010, mailed May 4, 2015, 15 pgs.

Elmore, John; Supplemental Notice of Allowability for U.S. Appl. No. 12/927,030, filed Nov. 5, 2010, mailed Jul. 15, 2015, 6 pgs.

Elmore, John; U.S. Patent Application entitled: Internet Based System and Method for Wafering on an Artist, having U.S. Appl. No. 12/927,030, filed Nov. 5, 2010, 19 pgs.

Emore, John; Non-Final Office Action for U.S. Appl. No. 12/927,030, filed Nov. 5, 2010, mailed Jan. 22, 2015, 11 pgs.

Elmore, John; U.S. Continuation Application entitled: Internet Based System and Method for Wagering on an Artist having U.S. Appl. No. 14/819,805, filed Aug. 6, 2015, 21 pgs.

Elmore, John; Non-Final Office Action for U.S. Appl. No. 13/694,804, filed Jan. 9, 2013, mailed Apr. 10, 2015, 10 pgs.

Elmore, John; U.S. Patent Application entitled: System and Method for Determining Audience Characteristics of a Music Concert Based on Mobile Phone Tracking and Mobile Data Transmission, having U.S. Appl. No. 13/694,804, filed Jan. 9, 2013, 26 pgs.

Elmore, John Edward; U.S. Provisional Application entitled: Internet Based Method and System for Ranking Artists Using a Popularity Profile, having U.S. Appl. No. 61/065,284, filed Feb. 11, 2008, 29 pgs.

Elmore, John; Notice of Allowance for U.S. Appl. No. 13/694,804, filed Jan. 9, 2013, mailed Nov. 9, 2015, 16 pgs.

Freeman, Duncan; U.S. Continuation Application entitled: Internet Based Method and System for Ranking Artists Using a Popularity Profile having U.S. Appl. No. 15/062,386, filed Mar. 7, 2016, 54 pgs.

Freeman, Duncan; Notice of Allowance for U.S. Appl. No. 13/694,804, filed Jan. 9, 2013, mailed Feb. 12, 2016, 11 pgs.

Freeman, Duncan; U.S. Continuation Application entitled: System and Method for Determining Audience Characteristics of a Music Concert Based on Mobile Phone Tracking and Mobile Data Transmissions, having U.S. Appl. No. 15/062,392, filed Mar. 7, 2016, 26 pgs.

* cited by examiner

| Rank | Band Name | Total Points | Prior Rank | | Music Sales | MySpace Fans | Last.fm Friends | ... | | Favorites | ... |
|---|---|---|---|---|---|---|---|---|---|---|---|
| 1 | Indecision | 18,533 | 1 | | $145,578 | 9,093 | 12,938 | | | [Add] | |
| 2 | Atom Ant | 17,209 | 7 | | $135,432 | 8,983 | 12,911 | | | [Add] | |
| ⋮ | | | | | | | | | | | |

801 — Rank; 802 — Band Name; 803 — Total Points; 804 — Prior Rank; 805 — Music Sales; 806 — Favorites

INTERNET BASED METHOD AND SYSTEM FOR RANKING ARTISTS USING A POPULARITY PROFILE

CROSS-REFERENCES TO RELATED APPLICATIONS

This application claims priority from U.S. provisional patent application Ser. No. 61/065,284 filed Feb. 10, 2008, which is incorporated herein by reference.

BACKGROUND OF THE INVENTION

1. Field of the Invention

This invention relates generally to the field of applications for Internet based websites. Moreover, it pertains specifically to a method and system for ranking a plurality of artists using a popularity profile generated for each artist from data gathered among sources accessible via the Internet. In the preferred embodiment, the popularity profiles will provide music artists with the ability to track and view their ranking and popularity.

2. Description of Related Art

Numerous online companies exist that purport to gauge the popularity of artists, particularly music artists. One famous example is Billboard.com, the online version of the long-standing purveyor of song and album charts, which ranks top-selling artists. A more recent example is last.fm, which provides music artist rankings based on song plays. The major problem with Billboard and its ilk is that the rankings are too limited. These companies highlight the top few hundred musicians at best, which is only a tiny portion compared to the hundreds of thousands of musicians that play to U.S. listeners. Moreover, they rank the musicians using only one or two criteria such as retail store sales and online song downloads. The same criticism can be said of rankings for other artists, such as authors. Only a relative handful of authors are ever showcased because the rankings are generally no more than best-seller lists.

The emergence of mashup sites combined with social networking tools has begun to address the limitations of the more conventional ranking sites. iLike.com, for example, provides lists of popular music based on the recommendations of listeners. Some sites like indiecharts.com provide a mashup of top artist lists (mainly from last.fm) along with rankings generated from voting by the listeners on the site. These are incremental improvements, but they still focus only on a narrow range of criteria as well as ignore the vast majority of artists who will never make it onto a "top 100" or "top 500" list.

In this sense, these tools are no more effective than sites like Billboard.com in showcasing the many artists whose sales or media presence may not be strong enough to lead the conventional top-seller lists but who nevertheless provide desired content for particular genres or niches—the "long tail" of the market.

SUMMARY

In view of the limitations now present in the prior art, the present invention provides a new and useful Internet based method and system for ranking artists using a popularity profile, which is simpler in use, more universally functional and more versatile in operation than known applications of this kind. It is also a purpose of the present invention to provide a new Internet based method and system for ranking artists using a popularity profile which has many novel features not offered by the prior art applications that result in a new Internet based method and system for ranking persons using a popularity profile which is not apparent, obvious, or suggested, either directly or indirectly by any of the prior art applications.

The goal of present invention disclosed herein, otherwise referred to as "The Popularity Profiling System," is to create a profile of an artist's popularity which he can track and view via a website or Internet-connected device. Artists may include musicians, book authors, filmmakers, painters, and other creators of art and content. The popularity of a music artist, for example, would be gauged not merely on music sales or song downloads but would also include a plethora of additional data available via the Internet/world wide web. The key motivation of the invention is the notion that what artists want most is to see the fruits of their creativity and effort enjoyed by others and to achieve some measure of appreciation, perhaps fame, however small or great their sphere of influence in the world. This is a far more powerful desire than merely making money (and most artists make little or no money from their craft). And what fans want most is to enjoy a variety of content as well as to be able to spot trends and artists that interest them, especially within particular niches and music genres. No other tools or companies exist which adequately serve these needs. The "secret sauce" of the company is the power of the PPS to capture and analyze both quantitative and qualitative data from any number and variety of sources and to translate that data into a meaningful set of scores with which to rank artists.

The Popularity Profiling System disclosed herein provides bands and musicians with the ability to track and view their ranking and popularity. This is achieved, in part, by amalgamating data about a band or musician's online presence and activity, including their participation and reception on social networking sites, as well as music plays and downloads from web sites such as a personal web page, a blog, a MySpace page, a FaceBook page, a YouTube page, or online stores like iTunes and CD Baby, among numerous other sites for which a band or musician has listed their information and/or provided their music for streaming or downloading. Music enthusiasts can quickly see which bands and musicians truly are the top artists as well as identify the up-and-coming artists in the world. Ranking may be broken down into particular niches (e.g. location, socio-economic and demographic characteristics of listeners, etc.) and music genres, while bands and musicians can see how they rank amongst other artists in their particular genre, as well as within the entire music industry. Moreover, music artists can use the Popularity Profiling System to help them promote their music more effectively.

The Popularity Profiling System aims to help musicians determine where their music ranks within a particular niche or music genre, as well as within the entire music industry, so as to help them find better ways to promote their music. This is achieved in part by The Popularity Profiling System's use of web crawlers, spiders, and/or scrapers to circumnavigate the Internet looking for data about a particular band or musician (e.g. how many MySpace friends, how many downloads on iTunes, how many plays on last.fm, how many blog posts, etc.). The information or data that is gathered is then processed utilizing proprietary software to achieve, in part, a relative point system as well as other factors to determine the positioning of the band or musician within the ranking system, placing them either above or below other artists that have also been profiled. As such, the ranking system is fluid and changes continually, providing a more holistic and accurate representation of an artist's popularity.

The metrics for determining the popularity profile of an artist include, but are not limited to: online sales, retail sales, file sharing, peer-to-peer network metrics such as number and frequency of files of artist content shared, number and frequency of online song plays (or content views), number and frequency of radio station song plays, social network (e.g. MySpace, FaceBook, etc.) metrics such as number of friends/fans, number of videos (and their plays) on YouTube and similar video-sharing sites, total page views of websites showcasing the artist, music fan and enthusiast voting related to the artist, reviews of the artist or his content, blog posts related to the artist, number of songs published by the artist, non-music merchandise sales and other factors not referred to herein which may represent a scalable or measurable factor for determining popularity ranking and is therefore to be considered apparent and obvious to the disclosure contained herein.

The Popularity Profiling System also provides artists with the ability to incorporate widgets and badges on their websites (including their MySpace page, Facebook page and the like), allowing them to display their ranking(s). In one embodiment, a musician can place a widget or badge on his website and his fans can vote for the musician by interacting with the widget or badge (typically by clicking on a button), which effectively provides for user-generated input into the profiling system. Additionally, music critics, journalists, enthusiasts and the like can write reviews of each ranked band, which are then analyzed, ranked by readers, or otherwise scored and incorporated into the calculation of the musicians' popularity profile and ranking. Further, The Popularity Profiling System also allows bands, musicians and artists to create surveys and allow their fans, listeners and music enthusiasts to take these surveys either on the company's web site or through third party web sites, blogs and online applications. As with reviews written by music critics and enthusiasts, the surveys are analyzed and incorporated as part of the popularity profile data utilized by The Popularity Profiling System.

It is to be understood that the present invention may embody a method and process for conducting and hosting a variety of internet based contests through the main service website that will allow bands or individuals to compete against each other in a variety of goal, ranking, vote, popularity, sentiment or other type of result-based competition, including but not limited in use to, "The Most Improved Band or Individual", "This Month's Hottest Band", "Americas Hottest Band or Individual Musician", "Next Big Thing", "Worlds Most Popular", and a variety of other contest embodiments not referred to herein which can result from use of the present invention disclosed herein of The Popularity Profiling System.

It is to be further understood that the main service website disclosed herein may offer users a method of advertising to other members or users of the website including offering a main community members advertising page whereon a user can solicit or search for artists or band members or other services in a manner which displays free or paid ads to website users.

The website may further offer each user or artist a web page which is specific to that user which can then be advertised, promoted, linked to, or otherwise utilized by the band or user as their own web page specific to the parameters set forth by the main service website, whereby the band or user would pay a periodic or one time fee for the webpage, or will be allowed use of the web page as part of a paid membership to the main service website.

BRIEF DESCRIPTION OF DRAWINGS

FIG. 8 illustrates the layout of a data visualization tool referred to as the Board.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
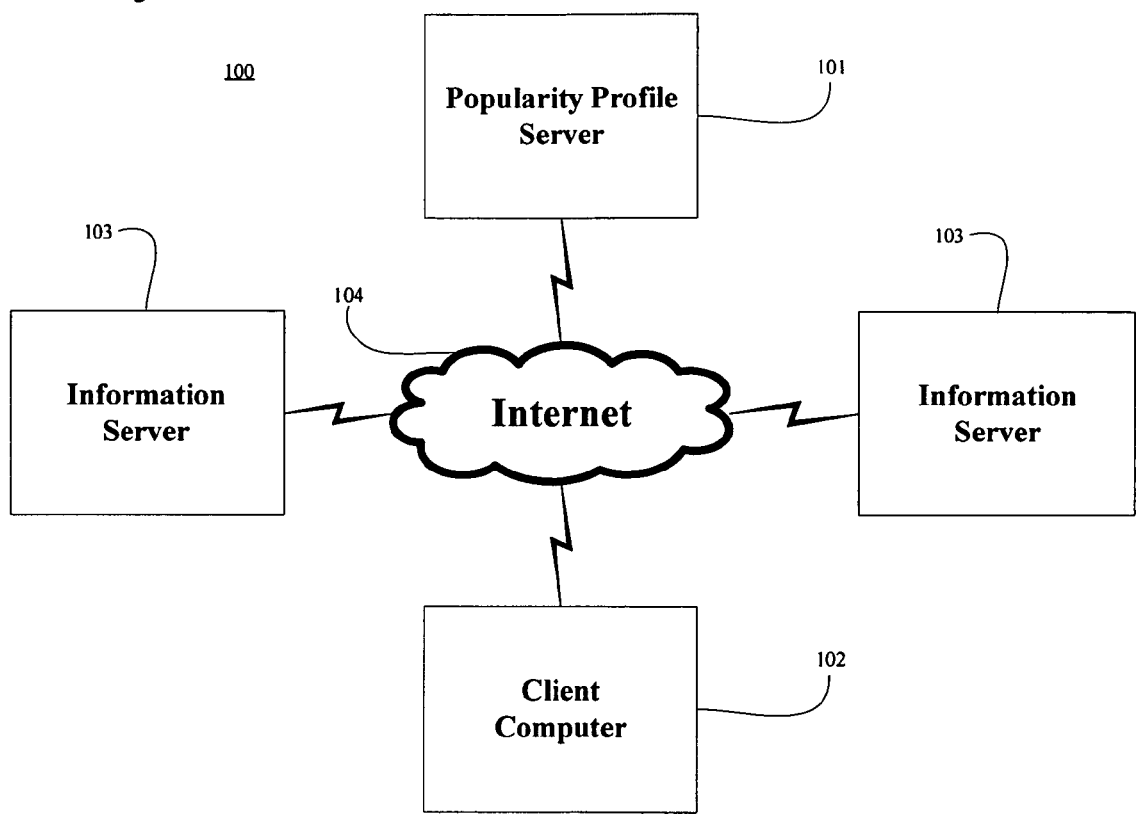
FIG. 1 is a diagram illustrating the server/client network relationship of the Popularity Profiling System server, information server(s) and client(s).

FIG. 1 illustrates a computing environment in which preferred embodiments are implemented. The computing environment 100 includes the Popularity Profiling System (PPS) Server 101, at least one client computer 102, and a plurality of information servers represented by 103a, b that communicate over the Internet 104 and each operate on separate distinct physical computers (they share no computing resources) associated with a unique IP address. Computer software operating within this environment 100 may employ software and methods of application, including various pieces of code, including, but not limited to XML, SOAP, PHP, Java, Javascript, Flash, DHTML, HTML, RSS, VML, Perl, Python, Scala, Objective-C and C/C++.

All systems 101, 102, and 103a, b communicate using a document transfer protocol such as Hypertext Transfer Protocol, or any other document transfer protocol known in the art, such as FTP, Gopher, WAIS, XMLP, etc. The client 102 includes a browser program, such as an HTML browser, capable of submitting requests using the HTTP protocol in a manner known in the art. If the client 102 requests the URL for the PPS Server 101, then the PPS Server 101 would return an HTML page in which the user at the client may make further requests.

Figure 2:
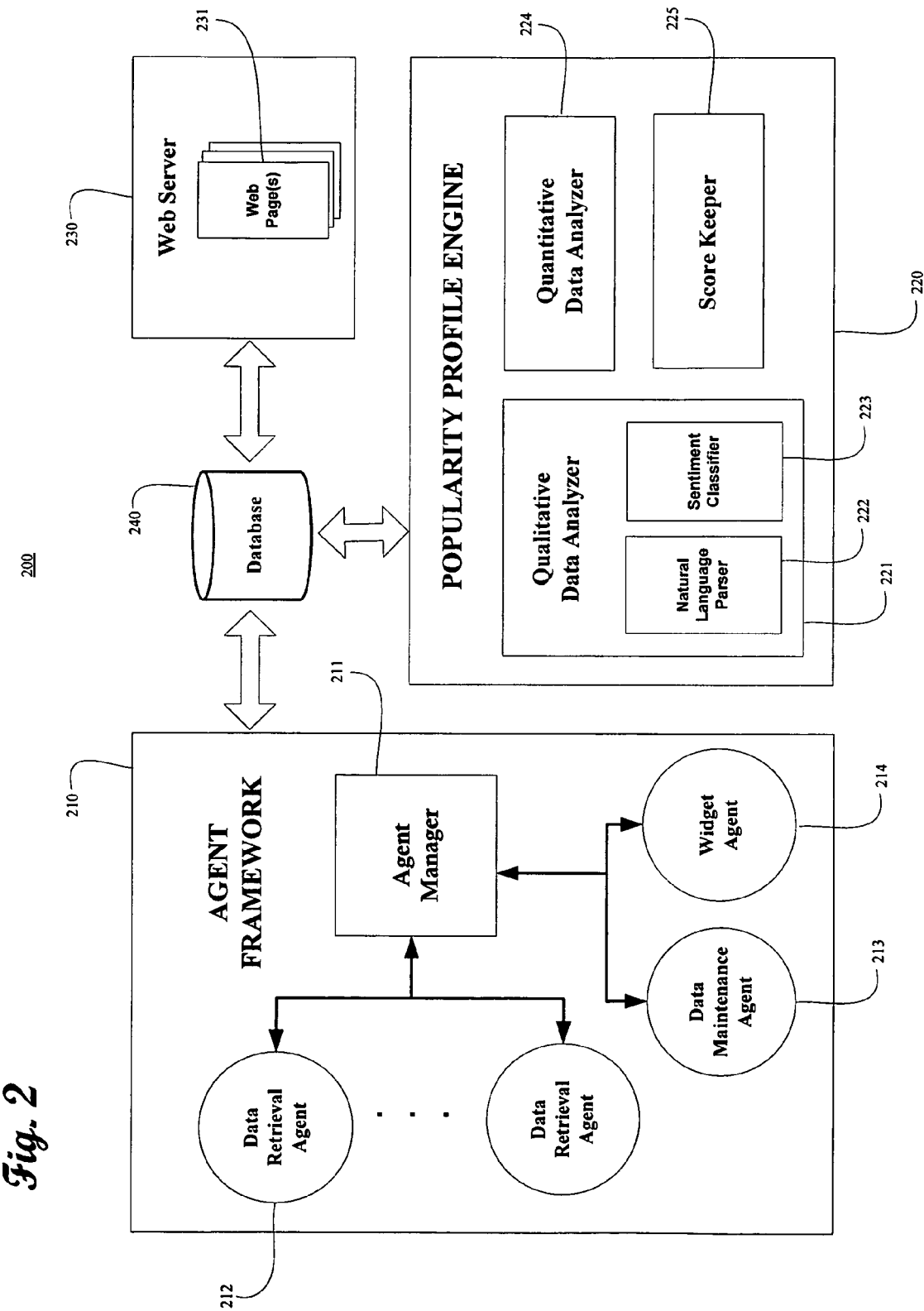
FIG. 2 is a diagram of the Popularity Profiling System.

FIG. 2 illustrates the PPS 200 which operates on the PPS Server 101. The PPS 200 includes the Agent Framework 210, the Popularity Profiling Engine 220, a web server 230, and a database 240. The PPS Server 101 operates on a single and distinct physical computer having a unique IP address.

1. Agent Framework 210

PPS Agents are organized into five categories as follows.

1.1 Data Retrieval Agent 212

A Data Retrieval Agent 212 retrieves predefined data from an information server 103 using either a third-party API or via extraction from HTML scripts using a web scraper. A Retrieval Agent generally focuses on accessing one source and extracting the criterion data from that source. The criterion data is passed through the Popularity Profile Engine so that it can be processed—and any relevant scoring can be updated—before the data is stored in the database.

A Retrieval Agent 212 can execute on the same server as other components of the Popularity Profiling System or it can execute on a separate server. In the preferred embodiment, one or more Retrieval Agents 212 reside on a separate sever and store data they retrieve into a local database existing on the same server. When a Retrieval Agent completes a retrieval task, it reports its status to the Agent Manager 211, seeks permission from the Agent Manager 211 to copy the data in its local database to the central database 240, and writes that data if permission is granted. The Agent Manager 211 is responsible for coordinating the activities of the Retrieval Agents 212, including what criteria data or portion thereof an agent 212 will attempt to retrieve. Hence, several Retrieval Agents 212 can be executed simultaneously in order to retrieve data from an information server 103, wherein each agent 212 requests a subset of the data from the server 103.

Retrieval Agents 212 are customized for their particular data sources. A MySpace Retrieval Agent, for example, would be coded with specific instructions on how to access MySpace web pages from an information server 103 containing relevant band information (or how to employ a $3^{rd}$ party service to do it), and it would extract that information from the retrieved web page(s) and place it into the database 240.

Further, the availability of application programming interfaces (APIs) for accessing data is rapidly increasing. Facebook recently unveiled an API for accessing its member data. Most of the other large social communities, including MySpace, LinkedIn and Orkut, have joined a consortium organized by Google to offer a common API referred to in industry as the OpenSocial API. A brief examination of the OpenSocial API, as well as Facebook API, suggests that access to member data is very limited for the time being, most likely to concerns over privacy and abuse by spammers and advertisers. last.fm has also announced that it is in beta testing for its API but it is not known at the time of this document the extent to which the company will provide access to artist data, esp. song play and download stats.

In short, over the long term it is expected that APIs will make data access much faster and easier from a variety of sources, but web scraping may still be needed over the short term to harvest the data needed.

Anyone of ordinary skill in the art will appreciate that many variations and alterations exist involving data mining and web scraping. It is intended that the use of other methods and variations of data mining and web scraping not specifically mentioned in this document but known in the art are within the scope of the present invention.

Figure 3:
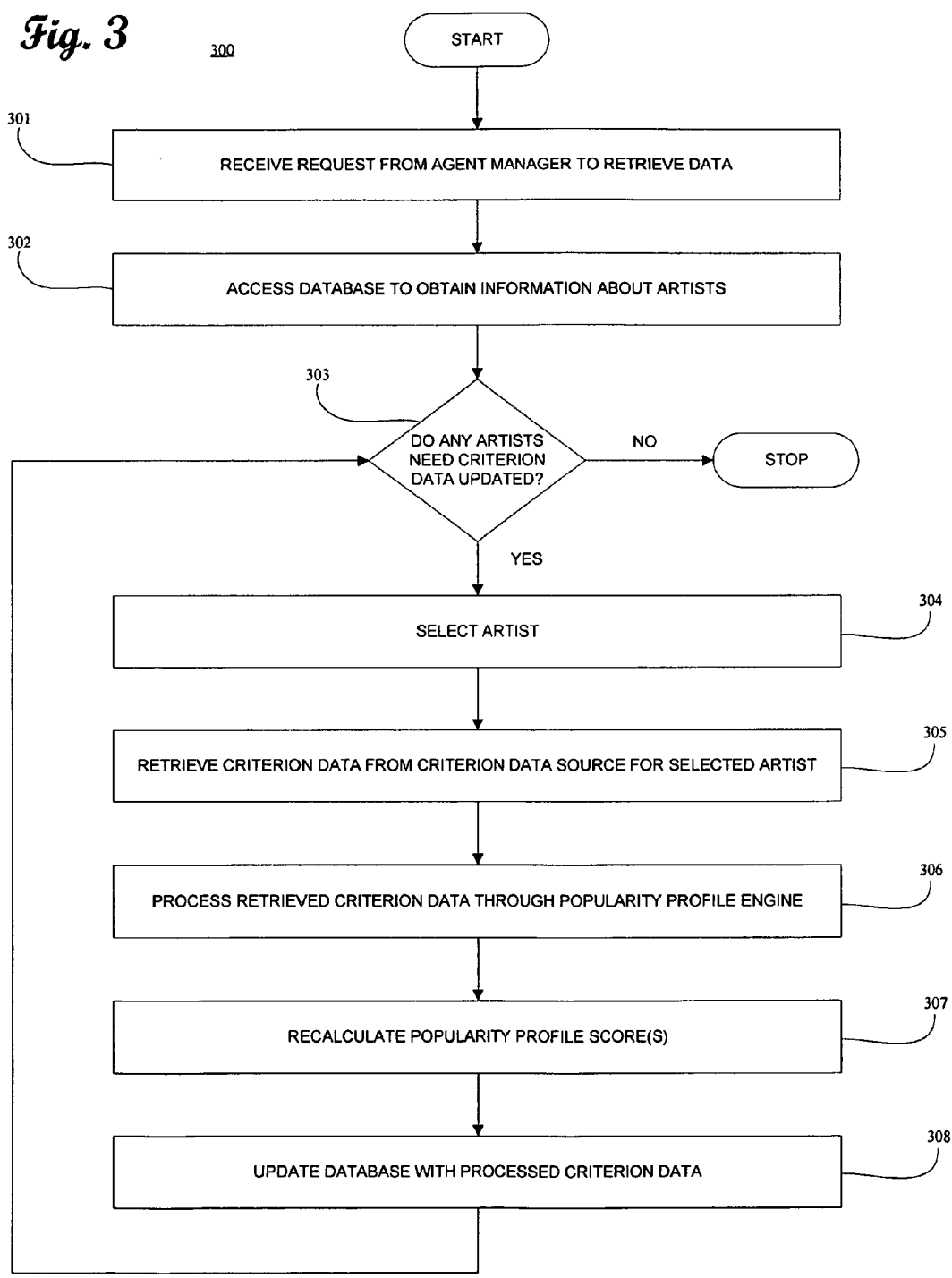
FIG. 3 illustrates a typical process in the preferred embodiment for retrieving data for particular artist(s) from an information source.

FIG. 3 illustrates a typical process 300 in the preferred embodiment for retrieving data for particular artist(s) from an information server 103. First, at step 301 a Retrieval Agent 212 receives a request, generally through the Agent Manager 211, to retrieve data. At step 302 the Retrieval Agent 212 accesses the database 240 in order to obtain information about the artist(s) that will help to determine how the agent 212 will access the information server 103 to retrieve profile criteria information associated with the artist(s). Before actually retrieving data from the information server 103, at step 304 the retrieval agent 212 first determines whether the artist(s)' profile criteria needs updating. This can be accomplished, for example, by determining if the last update was performed successfully within a particular time window.

Next at step 305, if it is determined that updating is warranted, the Retrieval Agent 212 selects an artist. If there is a plurality of artists from which to select, one is selected based on a method of ordering such as alphabetical ordering. Next, at step 306, the agent 212 retrieves the profile criteria from the information server 103, either directly through an API or indirectly through a $3^{rd}$ party application such as a web scraper. The raw retrieved data is placed into the database 240. Generally, at step 307, the agent 212 then signals the PPE 220 to conduct further processing on the retrieved data. Depending on the nature of the criteria, either the Quantitative Data Analyzer 221 or the Qualitative Data Analyzer 224 will be used to process the data. Following such processing, at step 308 the PPE 220 directs the Scorekeeper 225 to update any scores associated with the artist whose criteria has been processed. Finally, at step 309 these scores are stored in the database 240 along with any criteria not already stored.

Commonly, data is retrieved in the form of an XML file that is parsed by the Retrieval Agent to extract relevant data that is then inserted into the database for later use by other objects, notably data visualization tools. Many sources offer APIs with which to access data.

Figure 4:
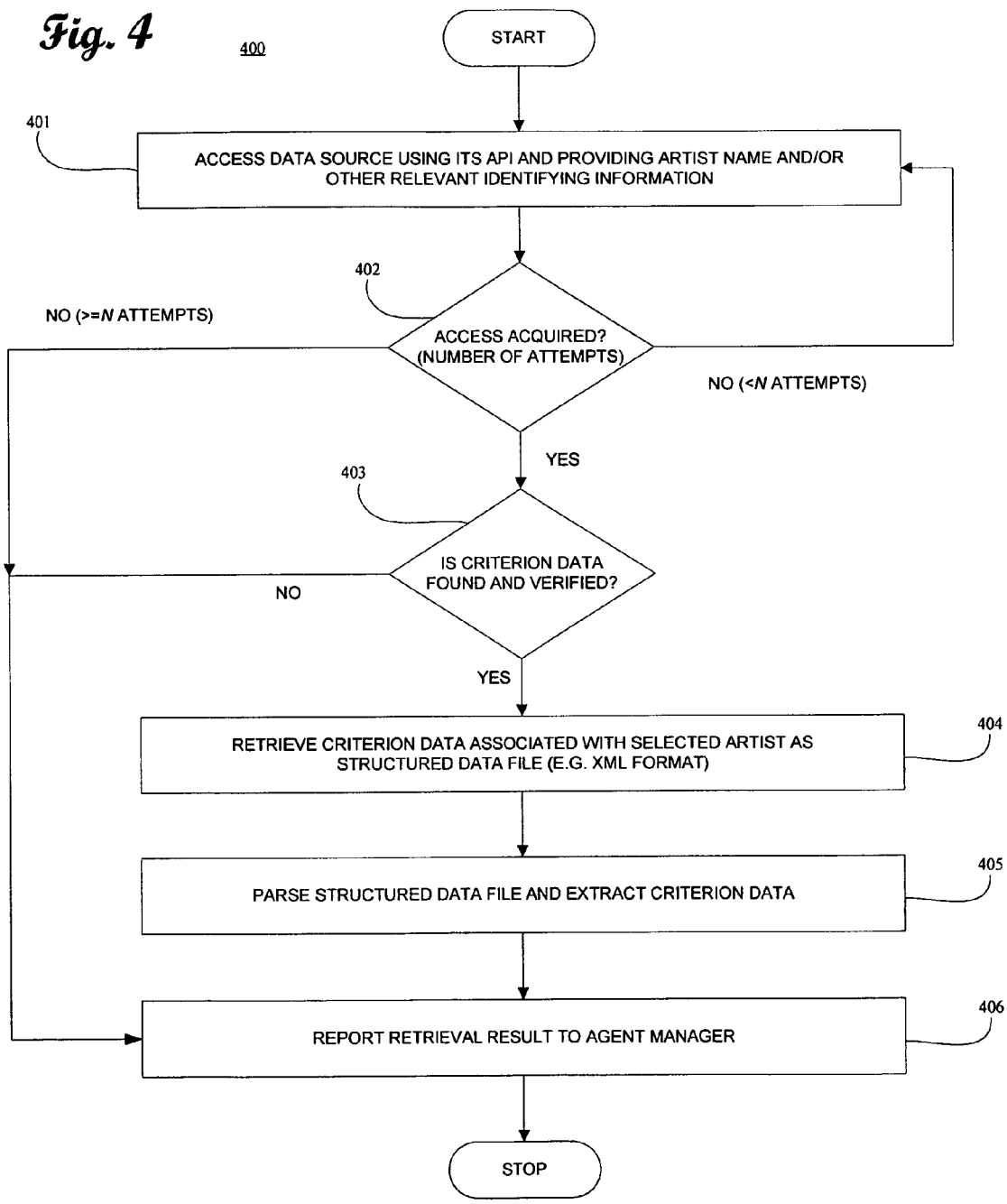
FIG. 4 illustrates a typical process in the preferred embodiment for retrieving data for particular artist(s) from an information source using an API.

FIG. 4 illustrates a typical process 400 for retrieving data for particular artist(s) from an information server 103 using an API. This process complements the overall retrieval process 300 and serves as a more detailed version of step 306. First, at step 401 the Retrieval Agent 212 attempts to access the information server 103 using its API, providing query information about the artist(s) to the server as needed. The condition at step 402 restricts the number of attempts that the agent 212 will make. Upon a connection with the information server 103, the condition at step 403 ensures that the server 103 has found the requested criteria and that the data returned to the agent 212 by the server 103 is verified to be intact and to be correctly associated with the artist for which the data was requested. Assuming the criteria requested is found and verified, at step 404 the agent 212 receives the data as a file, generally a file in the XML format. At step 405, the agent 212 parses the received file, extracts the criteria, and inserts the criteria into the database 240. Finally, at step 406 the Retrieval Agent 212 reports the status of the data retrieval to the Agent Manager 211.

Data retrieval from sources lacking an established API can be facilitated by the use of 3rd party web scrapers available from KapowTech.com (or OpenKapow.com) and Dapper.com. These web scrapers are tools for easily defining the data to be extracted from HTML code and converting the extracted data to XML files for download and insertion into the database. The web scrapers can be used in two ways. The first way is to utilize the scrapers as a web application, requiring an online account with either Dapper.com or OpenKapow.com. The method for finding and extracting the desired criterion data is defined using the scraper's tools and thereafter accessed through the scraper as a service call.

The second way is to integrate Kapow Technologies's Mashup Server as an integrated component of the PPS 200. The benefit to integration in this manner is more control over the scraper and less dependence on $3^{rd}$ party web services like OpenKapow.com which may experience service interruptions.

Figure 5:
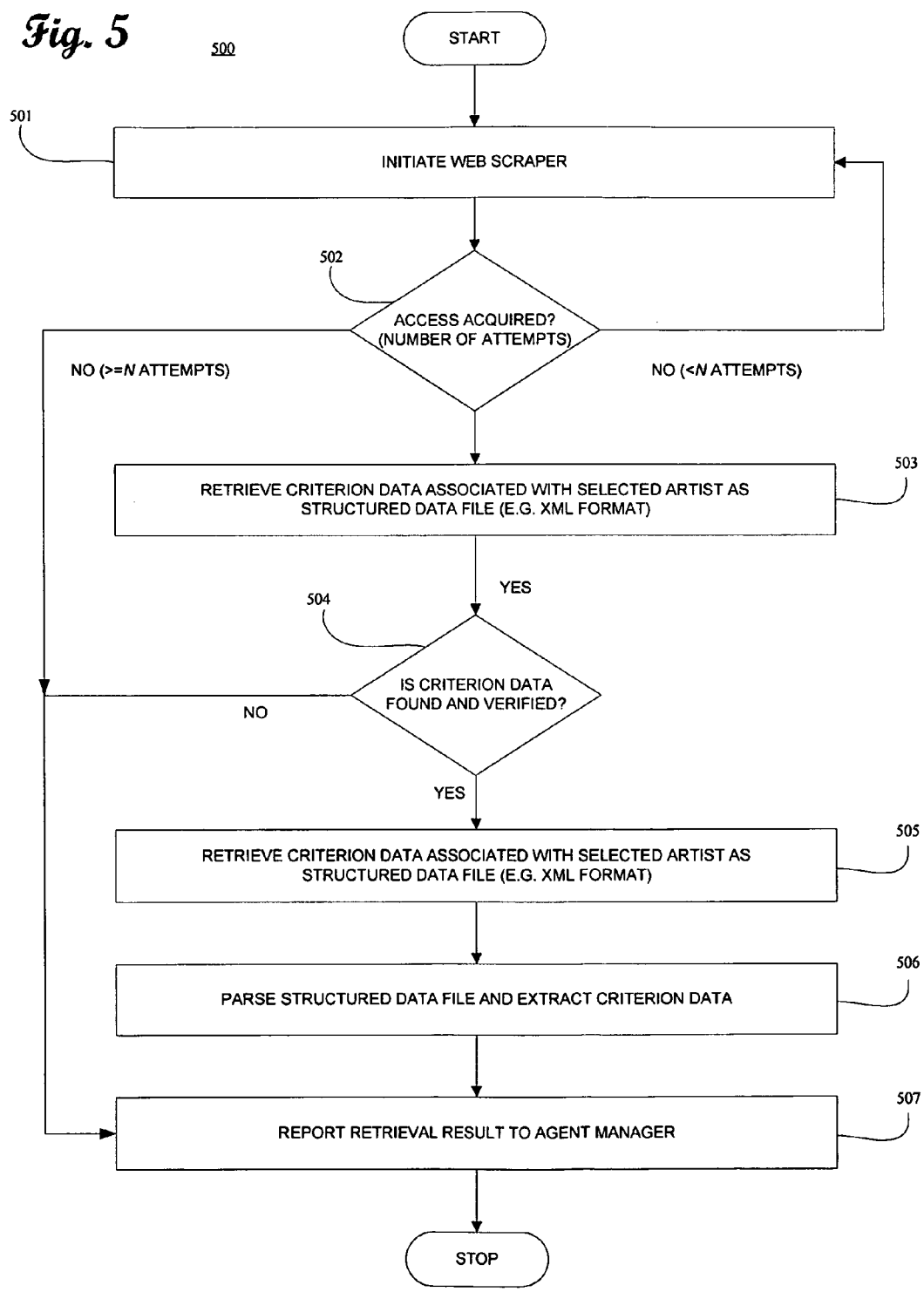
FIG. 5 illustrates a typical process in the preferred embodiment for retrieving data for particular artist(s) from an information source using a web scraper.

FIG. 5 illustrates a typical process 500 in the preferred embodiment for retrieving data for particular artist(s) from an information server 103 using a $3^{rd}$ party web scraper application. This process complements the overall retrieval process 300 and serves as a more detailed version of step 306. First, at step 501 the Retrieval Agent 212 accesses a web-based account established with a web scraper such as OpenKapow- .com. Alternatively, a 3$^{rd}$ party application such as the Mashup Server by KapowTech.com could be licensed and incorporated into the PPS as a dedicated component. The condition at step 502 ensures that the account is accessed within a limited number of attempts. At step 503, assuming access is successfully obtained, the agent 212 requests that the web scraper retrieve criteria based on a predefined script (e.g. a robot in OpenKapow.com), passing on to the web scraper any query information necessary to identify the artist(s) about which the data is to be collected. Next, the condition at step 504 ensures that the criteria data retrieved by the web scraper in response to the agent's 212 request, if any, is verified to be intact and to be correctly associated with the artist for which the data was requested. If it is, then at step 505 the agent 212 receives the data as a file, generally a file in the XML format. At step 506, the agent 212 parses the received file, extracts the criteria, and inserts the criteria into the database 240. Finally, at step 507 the Retrieval Agent 212 reports the status of the data retrieval to the Agent Manager 211.

Whether data is retrieved via an established API or a web scraper, the Retrieval Agent 212 makes only N attempts to connect to the source for a given session (where N is set through the Agent Manager 211 configuration and a session is defined as a period of relatively uninterrupted time where the Retrieval Agent 212 attempts to connect to the source on a periodic basis). Upon failure to access after N attempts, the Retrieval Agent 212 reports this failure to the Agent Manager 211 and terminates its instance. Upon a successful connection and retrieval of data, the Retrieval Agent 212 verifies that the data is a complete and accurate response to the request before parsing the resultant XML file.

In one embodiment, the Retrieval Agent 212 utilizes a 3$^{rd}$ party tool such as the java-based Apatar Engine from www.apatar.com. The Apatar Engine is an open-source tool that facilitates data mapping transformation between different data formats and databases. Alternatively, the Retrieval Agents 212 can be employed to parse XML files using tools such as XPath and XQuery.

1.2 Maintenance Agent 213

A Maintenance Agent 213 is simply the name given to a process that cleans up, indexes and otherwise maintains the database. This class of agent is responsible, for example, in ensuring that scoring is recalculated and updated properly and efficiently when new criteria data is added to the database as well as ensuring that data can be accessed quickly by the web server 230 through appropriate caching and indexing. The Maintenance Agent 213 will typically launch and monitor 3rd party applications to facilitate these tasks.

1.3 Widget Agent 214

A Widget Agent 214 monitors a widget application, such as a widget that displays the current ranking of an artist associated with it. The Widget Agent 214 is responsible for maintaining communication with the Agent Manager 211, database 240, and/or any other component of the PPS 200 in order to update the data utilized and presented by the widget. It can also be used to push data to the database (e.g. reporting activity from users who interacted with the widget, such as voting for an artist).

Widgets may include:

Badge Widget: a badge displayed on a website, social network page (e.g. Facebook MySpace, etc.), or the like that showcases metrics related to an artist's popularity, including current ranking number (overall or within a niche such as music genre) and/or ranking trend(s).

Remote Widget: a remote application, such as an application built using the Adobe® AIR platform, that resides on a computer desktop or is integrated into another application including a social networking site (e.g. Facebook, MySpace, etc.), wherein the widget facilitates the display of metrics related to an artist's popularity, which may include an artist ranking list and/or functionality similar to the website presented by the web server 230.

Community Widget: provides the ability of fans to provide feedback which may include: sending comments to be posted on the website presented by the web server 230 (via scrolling comments on the main page), voting, and filling out surveys and reviews. This feature may a distinct widget or one of several features of a Remote Widget. Comments, votes, surveys and other data are received from widgets and aggregated to the main website presented by the web server 230. Information collected may include the band to whom the fan is addressing (if applicable), the comment text, the date and time the comment was written, the IP address and/or name of the site that hosts the widget, and the identity (username or real name) of the fan originating the comment.

API Widget: provides an API to the PPS 200 for use by 3$^{rd}$ party applications. This is essentially a more general form of the Remote Widget that is intended merely as an interface to other applications rather than a stand-alone application. In its simplest form, it may provide 3$^{rd}$ party applications with access to the database 240. It may also provide functionally associated with the PPE 220.

1.4 Agent Manager 211

The Agent Manager 211 is responsible for monitoring the various Agents and ensuring that tasks are initiated and terminated as scheduled. The Agent Manager 211 also logs the results of tasks such as whether a Retrieval Agent 212 successfully retrieved data. Schedules and parameters for the agents can be set by a user with Administrator privileges by accessing the Agent Manager 211 through the Administrator web page presented by the web server 230.

1.5 Other Agents

Other agents will be developed as needed. For example, an agent may be the preferred way to facilitate requests and transmissions of RSS feeds, such as an RSS feed to artists to let them know their current ranking and stats.

2. Popularity Profiling Engine (PPE) 220

The Popularity Profiling Engine (PPE) 220 processes criteria data retrieved by the Data Retrieval Agent(s) 212 before it is stored in the database 240. Criteria data is that which is used to determine an artist's scoring and, subsequently, an artist's ranking compared to others.

The PPE 220 distinguishes between quantitative criteria data and qualitative criteria data. Quantitative data is already in the form of a number that can be directly employed for scoring. Examples include the number of books an author has sold on Amazon or the number of times a musician's song has been downloaded from a music repository. Qualitative data, on the other hand, cannot readily be used for scoring. It includes things like written song reviews, blog entries, articles and user comments. In order to be useful for scoring, such data must be translated into a number.

As shown below, the PPE 220 employs both a Quantitative Data Analyzer (QNDA) 224 and a Qualitative Data Analyzer (QLDA) 221 to process criteria data. The PPE 220 also employs a Score Keeper 225 to calculate artists' score(s) used for ranking and popularity profiling.

Figure 6:
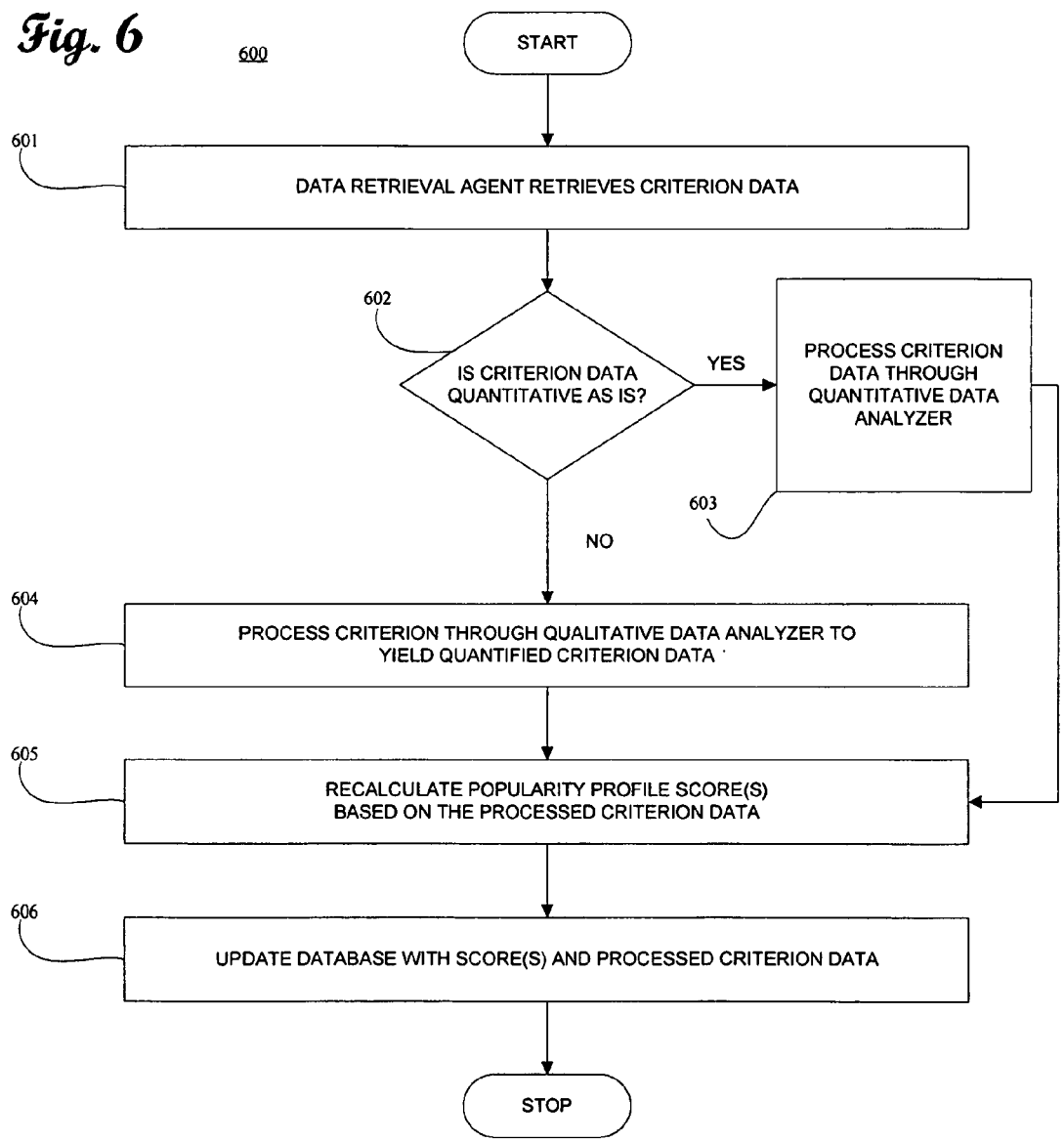
FIG. 6 illustrates the typical process in the preferred embodiment by which the Popularity Profile Engine determines how criteria data retrieved by a Retrieval Agent will be analyzed.

FIG. 6 illustrates the typical process 600 in the preferred embodiment by which the PPE 220 determines how criteria data retrieved by a Retrieval Agent 212 will be analyzed. First, at step 601 the PPE 220 is alerted by a Retrieval Agent 212 that data is available for analysis. The data is either passed to the PPE 220 directly from the agent 212 upon retrieval or accessed indirectly from the database 240 after the agent 212 has stored it there. The condition at step 602 directs the appropriate analyzer to process the data. If the data is quantitative by nature, the QNDA 224 analyzes the data at step 603. If the data is qualitative by nature, the QLDA 221 analyzes the data at step 604. The result of either step 603 or step 604 is a number for each criterion in the data. Next, at step 605 the PPE 220 passes the results of step 603 or step 604 to the Score Keeper 225, which uses those results to recalculate the scores associated with the artist(s) whose criteria was just analyzed. Finally, at step 606 the results of the analysis and the score(s) are stored in the database 240.

2.1 Quantitative Data Analyzer (QNDA) 224

The QNDA 224 receives quantitative (numerical) criteria data and performs any necessary processing on the data before making it available to the Score Keeper 225. Processing may include formatting or mathematical transformations. In many cases, the data may need no processing.

QNDA 224 will multiply criterion value by a transform function as follows:

i. Given an input x, which is the criterion value for a given artist for a sample period, the new value c is computed as c=xT where T is a mathematical operation.

ii. Typically, T is defined as a normalizing factor which is based on the inverse of the highest value detected per criterion multiplied by 100, such that $0 \leq T \leq 100$. That is, T=100/MAX(X) where X is the set of criterion values for all artists for the same sample period. E.g. if highest number of MySpace profile views in a set of all artists is 19,000 then T=100/19000=1/190.

iii. T can also be defined as a function that assigns c a value that depends on which range in R that x lies within, where R is defined as a set ranges of the format s . . . t, where s is the starting number of a range and t is the terminal number of the range and $r_i=1$ when $s \leq x \leq t$ and $r_i=0$ when $x < s$ or $x > t$. Then $$c = \sum_i r_i \phi_i$$

where $\phi_i$ is a set of i numbers. E.g., if x lies within the $3^{rd}$ range in the set R, and $\phi=\{50, 55, 65, 75, \ldots\}$, then c=65.

2.2 Qualitative Data Analyzer (QLDA) 221

The QLDA 221 receives qualitative criteria data and performs the necessary processing to transform it into a number or set of numbers that can be used by the Score Keeper 225.

One means to transform the qualitative data into a number is to use sentiment analysis. In the preferred embodiment, the Natural Language Parser 222 and the Sentiment Classifier 223 are employed to determine whether the qualitative data is favorable, unfavorable, or undetermined (or neutral) in regard to the artist. The Sentiment Classifier 223 accepts the qualitative criteria data (generally in the form of text) passed to the QLDA 221, ordinarily after processing it through the Natural Language Parser 222. As such, the Sentiment Classifier 223 generally is employed in conjunction with the Natural Language Parser 222, and the Natural Language Parser 222 separates natural language text into parts of speech for use by the Sentiment Classifier 223. The classifier 223, in turn, analyzes the text and its parts-of-speech structure in order to determine the sentiment of the writer in regard to the subject of the text.

The sentiment of the writer can be gauged in a number of ways known to one of ordinary skill in the art. One reference for the mathematical workings of the Sentiment Classifier 223 is the paper produced by a group at Cornell titled "Thumbs up? Classification using Machine Learning Techniques" (available at http://www.cs.cornell.edu/home/llee/papers/sentiment.home.html).

In the preferred embodiment, the sentiment of the writer is gauged as favorable, unfavorable, or undetermined (neutral). A favorable sentiment, for example, would entail a song review wherein the reviewer praised the song. Likewise, an unfavorable sentiment would entail a song review wherein the reviewer disparaged the song. An undetermined (or neutral) item is simply one where favorable or unfavorable status cannot satisfactorily be determined by the classifier 223 using methods known in the art.

Anyone of ordinary skill in the art will understand that many variations and alterations exist involving sentiment analysis. As mentioned, one embodiment of the present invention employs sentiment analysis to classify text into one of three categories: favorable, unfavorable and undetermined (neutral). Further embodiments may employ sentiment analysis to classify text into different and/or additional categories, or to form determinations of writer's sentiment other than mere classification into categories.

Figure 7:
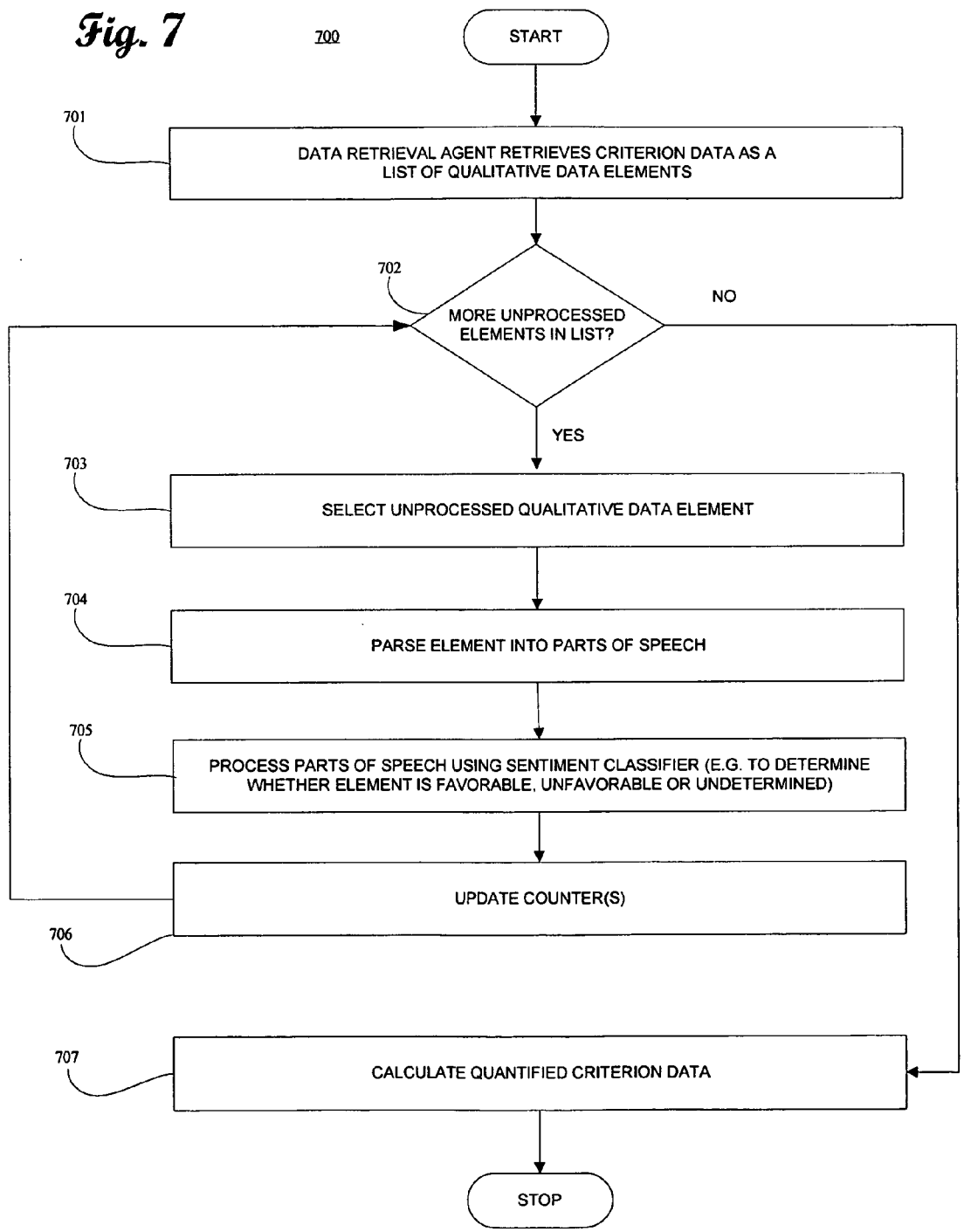
FIG. 7 illustrates the typical process in the preferred embodiment for qualitative analysis of profile criteria retrieved by a Retrieval Agent.

FIG. 7 illustrates the typical process 700 in the preferred embodiment for qualitative analysis of profile criteria retrieved by a Retrieval Agent 212. First, at step 701 the QLDA 221 receives criteria from the Retrieval Agent 212. The criteria may be in the form of natural language text, or it may be text that has already been structured. In any case, the criteria is organized into a list of "data elements", which are groupings of text that each constitute the single expression of a writer. Examples include a song review, a user comment, and an entry in a discussion forum or blog. That is, a series of blog entries would be presented to the QLDA 221 as a series of data elements, with each data element corresponding to a single blog entry. The condition at step 702, as well as the selection from the list of data elements at step 703, ensures that the data elements are all fed sequentially through the process. At step 704, a given data element is parsed into parts of speech using the Natural Language Parser 222, assuming the data element is not already structured in this manner. Then at step 705, the parsed data element is passed to the Sentiment Analyzer 223, which analyzes the parsed data element and assigns to it a numerical value of 1 (favorable), −1 (unfavorable), or 0 (undetermined or neutral). Next, at step 706, counters are updated which track the number of data elements being processed. Finally, at step 707 the overall sentiment analysis is completed wherein a single numerical value of 1 (favorable), −1 (unfavorable), or 0 (undetermined or neutral) is assigned to a criterion. Note that a plurality of data elements may be associated with a criterion, so the individual values assigned to the data elements may be used in a mathematical expression to generate a single number, such as calculating the mean. The result may also be rounded to present the final number as 1, −1 or 0.

In the preferred embodiment, the counters are a means of determining a numerical metric for popularity based on the number of favorable and unfavorable items encountered. It is anticipated that three counters will be used: number of favorable items, number of unfavorable items and number of undetermined/neutral items—the sum of which yields the total number of items processed. A number of metrics also may be utilized such as the ratio of favorable to unfavorable, the percentage of favorable items to all items, and the like.

An example of a natural language parser and classifier that may work well in this capacity is LingPipe (see www.alias-i.com/lingpipe/index.html), a suite of open source Java libraries that provide the following features:
track mentions of entities (e.g. people or bands);
link entity mentions to database entries;

uncover relations between entities and actions;
classify text passages by language, genre, topic, or sentiment;
correct spelling with respect to a text collection;
cluster documents by implicit topic and discover significant trends over time; and
provide part-of-speech tagging and phrase chunking.

Anyone of ordinary skill in the art will recognize that the QLDA 221 has tremendous capacity for expansion beyond mere determination of favorable versus unfavorable sentiment. As the "semantic web" becomes more of a reality and the tools for textual analysis (particularly sentiment analysis) improve, the use of sentiment analysis will expand into a more sophisticated analysis of the qualitative data. This has the potential of providing more feedback regarding the mood and sentiment of artists' fans as well as to better pinpoint the context within which the fan is expressing an opinion. For example, distinctions can be made between the sentiments of different types of fans as categorized by education (whether college educated, whether currently in college, etc.), geographic location, socioeconomic level, and particular interests/hobbies. This will provide a more insightful and targeted popularity profile. And it will be extremely useful in providing feedback for targeted advertising on the website as presented by the web server 230.

Another alternative is that this data can be analyzed (and may also be combined with the aforementioned quantitative data), and packaged for sale to market research and advertising firms. It will also greatly enhance the value of the invention to 3rd party developers.

2.3 Score Keeper 225

What users of the website presented by the web server 230 generally want to see is the ranking of artists relative to one another. Ranking is determined by the relative score(s) of an artist compared to others, whether overall or within a particular grouping of artists (such as by a niche or music genre) or by a particular grouping by category of criteria. The Score Keeper 225 is a component of the PPE 220 that computes the various scores associated with an artist. In the preferred embodiment, there is one overall score as well as at least one score per information source (e.g. a score for MySpace). There may also be separate scores for categories of criteria (e.g. downloads).

An artist's popularity profile consists of all the processed criteria data and score(s) (points) associated with the artist. It can also include rankings where score(s) can be compared with other artists in the proper context.

In the preferred embodiment, an artist's score(s) is (are) calculated as follows:

$$\text{Score} = \sum_n c_n m_n w_n$$

where $c_n$ is the value of the $n^{th}$ criterion, $m_n$ is the momentum factor of the $n^{th}$ criterion and $w_n$ is the value of the weighting factor associated with the $n^{th}$ criterion, given n number of criteria. The momentum factor reflects the rate of change of the $n^{th}$ criterion by comparing the criterion's values over a time period.

Alternatively, an artist's score(s) is (are) calculated as follows:

$$\text{Score} = m \sum_n c_n w_n$$

where $c_n$ is the value of the $n^{th}$ criterion, m is the momentum factor and $w_n$ is the value of the weighting factor associated with the $n^{th}$ criterion, given n number of criteria. Further, the momentum factor in the alternative may be determined by comparing scores instead of criteria over a time period.

Further, an artist's score(s) could be measured by adding, subtracting, multiplying and/or dividing one criterion (with or without the product of the criterion with its momentum and weighting factors as shown above) by another rather than simply taking the sum as shown above. In this sense, the criteria essentially could be used within a mathematical formula in order to calculate a score. Further still, scoring may be achieved by multiplying a weighting factor not only to an individual criterion but also to a grouping of criteria.

The weighting factor serves to enhance or diminish the importance of a given criterion. If set to 0, the weighting factor will effectively turn off a given criterion by negating its contribution to the total points. In the preferred embodiment, the weighting factor is preset but may be modified to a value between 0 and 1 by a user manipulating a slider or similar graphical user interface tool on a webpage as presented by the web server 220. In another embodiment, the weighting factor is preset and cannot be modified by a user.

Alternatively, the weighting factor may be a mathematical equation, such as a logarithm. In the preferred embodiment, the momentum factor $m_n$ for the nth criteria measures its acceleration; that is, its rate of change over a period of time. Values for the nth criterion computed over a period of time constitute a one-dimensional discrete-time function $c_{n_k}=f[k]$, where $c_{n_k}$ is real and k is a natural number (k=1, 2, . . . , l) representing one to l samples at which the criterion value $c_n$ was calculated over a period of time. Anyone of ordinary skill in the art will recognize that a variety of methods are available to calculate acceleration of a discrete-time function and that the employment of one method over another does not depart from the scope of this invention.

One way to calculate this momentum factor is to take gradient (or its approximation) of $f[k]$. Anyone of ordinary skill in the art will recognize that a variety of methods are known to calculate the gradient (or its approximation) of $f[k]$. Another way to calculate the momentum factor is to transform the discrete-time function $f[k]$ into a continuous function $f(k)$ using a curve-fitting approach, such as cubic-spline-based interpolation or Fourier-approximations, and then computing momentum from its second derivative:

$$m_n = f''(k).$$

The momentum factor may also be normalized or bounded within a numerical range (e.g. 0.0 to 2.0) by further mathematical operations known to those of ordinary skill in the art.

In the preferred embodiment, the momentum factor is a real number within a range (e.g. 0.0 to 2.0) and is calculated over a moving time window using $f[k]=(c_{n_k}, c_{n_{k-1}}, \ldots, c_{n_{k-j}})$ where k is a natural number (k=1, 2, . . . , l) representing one to l samples, j is the window size, and j≤l. The momentum factor is greater than 1.0 when the value of the criterion over the time window is positively accelerating, less than 1.0 when the value of the criterion over the time window is positively accelerating, and is equal to 1.0 when no significant momentum is determined. The momentum factor effectively rewards more recent surges in popularity measures while diminishing the contribution of popularity measures that are further in the past and are waning. It may be normalized or limited to restrict its value (or else very large numbers may result in times of rapid change in the criteria values).

In the preferred embodiment, the quantitative score criteria for music artists include one or more of the following:
1) Online sales—metric achieved through companies like CD Baby and/or Sound Exchange;
2) Retail sales—metric achieved through companies like Soundscan;
3) File sharing via peer-to-peer networks through companies like bittorrent.com;
4) Online song plays through a variety of sites—metric achieved through companies like Rhapsody, Pandora and FoxyTunes;
5) Number of online radio stations that play the artist's music—metric achieved through companies like last.fm;
6) Number of broadcast radio stations that play the artist's music—metric achieved through companies like Neilsen;
7) Social network site (e.g. MySpace and Facebook) metrics including number of friends and number of song previews via the sites;
8) Number of videos and plays of each video featuring the artist on video sharing sites like YouTube;
9) Total unique page views of artist profile at web site as presented by web server 220—metric achieved in part through Google Analytics;
10) Total unique page views of any given web site, (e.g. MySpace page) and blog, etc.—metric achieved in part through Google Analytics;
11) Number of people that added the artist to their iLike account;
12) Number of "professional" reviews of the artist or artist's song(s)—metric achieved through companies like Taxi;
13) Number of people subscribe to the artist's mailing list—metric achieved through the artist or his web host;
14) Number of videos featuring the artist viewed on synchroncitylive.com;
15) Number of blog posts mentioning the artist or the artist's song(s)—metric achieved through companies like Technorati;
16) Number of concerts each month featuring the artist—metric achieved through the artist or companies like Ticketmaster and synchroncitylive.com;
17) Songs by the artist published online—metric provided by companies like BMI, ASCAP or SESAC;
18) Merchandise sales associated with the artist—metric achieved through the artist or merchandisers (alternatively, award points based on whether any relevant merchandise is offered through certain benchmark retailers);
19) Number of bands covering the artist's music—metric provided by companies like the Harry Fox Agency;
20) Number of music (song) reviews or points awarded based on music reviews;
21) Number of plays of the artist's song(s) through online sites like last.fm;
22) Number of mentions of the artist or the artist's song(s) on Twitter;
23) Number of times an artist is designated as a "favorite" on a rating site (or via a tool used within a social networking site) such as iLike, Hype Machine, or Pandora;
24) Number of songs in blog post as measured by services like Snowcap and Sonific.
25) Whether and the number of times a song is played by one or more of a number of terrestrial radio stations as compiled by Yes.com.

Some examples of qualitative criteria for music artists include:
1) Music (song) reviews;
2) Blog entries and reader comments;
3) Discussion group postings;
4) Published articles mentioning the artist or the artist's song(s).

3. Database 240

The database 240 stores most of the information utilized by the PPS 200. One of ordinary skill in the art will appreciate that the database 240 can be implemented using a variety of open source and commercial products and tools. In one embodiment, the database 240 is implemented using MySQL software.

4. Web Server 230

The Web Server 230 generates one or more web pages 231 which may utilize data from the database 240. A typical web page 231 is a document composed in languages including but not limited to HTML, DHTML, Java, Javascript, JSP, ASP, PHP and XML; it may be implemented with other computer protocols, languages, and techniques known in the art. A web user may register on the website, providing personal and/or login information, in order to procure a website-based user account and gain access to restricted web pages 231 and/or features.

In the preferred embodiment, a client computer 102 requests a web page 231 from the Web Server 230 via a web browser by navigating to the web address IndieRankings.com. The Web Server 230 may respond to other web addresses as well.

In the preferred embodiment, the fundamental goal of the website presented by the Web Server 230 is to provide a simple, easy to use tool for assessing the popularity of a music artist or band. A data visualization tool provided via the web page is an interactive table displaying rows of artists and scoring criteria in rank order. This tool is referred as the Board 800. It lists artists and bands in ranked order starting with 1 (highest ranking). As discussed, ranking is determined by a weighting of selected criteria as calculated by the Score Keeper 225. Whether a band appears on the Board depends on ranking and music genre. The Board 800 will list the top x bands based on ranking from 1 (highest points) to x. The default setting is that the top bands are listed without respect to genre. However, the user can select a particular genre and the Board 800 will then refresh to show only bands which belong to the selected genre (in the order of ranking).

While the Board 800 will display at most x bands at a time, the user can select to see another page of rankings which would display another x number of bands that follow the previous list in order of ranking (i.e. bands ranked x+1 to 2x, then 2x+1 to 3x, and so on).

FIG. 8 illustrates a typical layout of the Board 800. The columns display types of information as indicated by the column header. Rank 801 is the ascending or descending order of the artists by Points 803. Artist Name 802 is the name of the artist or band. Points 803 are the points as calculated for the artist by the Score Keeper 225 for the current period. Previous Points 804 are the points as calculated for the artist by the Score Keeper 225 for a prior period.

The Board 800 also displays the numerical value of one or more criteria 805 with which the Points 803 were calculated by the Score Keeper 225. The Board adjusts its columns and width to the number of active criteria, using a scrollable panel if helpful.

The Board 800 provides some interactive tools for the web user. First, Favorites 806 displays an icon indicating whether an artist shown in the same row is marked in the database 230 as a favorite of the web user and allows the web user to click on it to add or remove the artists from the web user's list of favorite artists (assuming the web user has registered an account with the website). Second, a web user can click on a column header to prompt the Board 800 to sort the rows by the ascending or descending order of the data in that column. A click on the band name column 802 will display the list of bands in alphabetical order. A click on the rank column 801 will always return the Board to the original order. Third, sliders 807 within each column heading for criteria 805 provide the web user a tool for increasing or decreasing the weighting factor of each criterion used by the Score Keeper 225 by moving the slider right or left, respectively. Moving a slider 807 completely to the left would elicit a value of 0 and effectively turn off the associated criterion as a contributor to Points 803. Moving the slider completely to the right would elicit a value of 100 and allow the full contribution of the criterion value. Anyplace in between would elicit a partial contribution.

The basic features of the Board 800 and related webpage 231 tools include:
1) Displaying in rank 801 order an artist/band name 802 along with points 803 (and 804) and criteria data 805;
2) Allowing a user to paginate through potentially thousands of rankings (rows);
3) Allowing a user to sort the rankings (rows) based on any of the columns including artist name 802 and criteria 805;
4) Allowing a user to search for artists by entering keywords;
5) Allowing the user to retrieve further information about an artist by clicking on the artist name 802 (on the row for a particular artist) (or alternatively by hovering over a name 802 with the mouse).

Advanced features (requiring user registration) of the Board 800 and related webpage 231 tools include:
1) Allowing a user to adjust the weighting of criteria (in a range of 0% to 100% contribution) using a slider 807 in the column header so as to customize how points 803 are calculated (and hence customize the rankings);
2) Allowing a user to jump to the ranking 801 of an artist/band to which the user is associated (requires registration of a band for that user);
3) Allowing a user to add (or remove) an artist/band from a "favorites" list and, in addition, allowing a user to view in the Board 800 only the rankings 801 of artists in the user's list. An additional feature may provide the user the ability to view artists belonging to the favorites lists of other users as well.

The webpage 231 may provide a search box wherein the web user types the name or partial name of an artist/band in order to prompt the webpage 231 via the Board 800 to display artists whose names 802 significantly contain or match the search term(s).

The webpage 231 may provide one or more comboboxes, or other web browser user interface device(s), that will allow a user to select one or more music genres in order to prompt the webpage 231 via the Board 800 to display artists whose names 802 significantly contain or match the search term(s). Selecting "jazz" and "rap," for example, will limit the Board 800 to display only those artists whose genres include "jazz" and/or "rap". The operation of the Board 800 would then conform to the results of the limitations under the music genre(s) selected.

The webpage 231 may provide one or more comboboxes that will allow a user to select one or more geographical locations (city, state and/or region). As with music genres, the selection acts as a filter for the list of artists (by row) displayed via the Board 800. Selecting "Southeast" for example, will limit the Board 800 to display artists in the list whose location is principally in the Southeast. The operation of the Board 800 would then conform to the results of the limitations under the location selected. Location may be defined as the principal address of the band, but location also may be defined by other concepts such as where the artist's music is most popular. It will be clear to one skilled in the art that limitations other than location can be utilized in order to display on the Board 800 artists within a particular niche and that use of such other limitations are within the scope of the invention. In the layout of the Board 800, an artist/band's logo or picture could be shown beside its name 802.

In one embodiment of the Board 800, when a user clicks on an artist/band name 802 a popup window (or a simulated popup window utilizing DHTML) displays the profile of the artist/band. A popup window or "tip tool" may also appear when the mouse pointer hovers over the name 802. An alternative is to incorporate a tool such as the SmartLink technology from Adaptive Blue, Inc. (at www.adaptiveblue.com), whose popup windows display background information on the artists/bands.

It will be clear to one skilled in the art that the above embodiments may be altered in many ways without departing from the scope of the invention.

OBJECTS OF THE INVENTION

Accordingly several advantages and objects of the present invention include but are not limited to:

A principal object of the present invention is to provide a Popularity Profiling System and Method that will overcome the deficiencies of the prior art devices.

An object of the present invention is to provide a Popularity Profiling System and Method that will provide rankings and popularity of musicians, bands and artists, including a global ranking as well as rankings within particular niches and music genres.

An object of the present invention is to provide a Popularity Profiling System and Method that will provide an analysis of the trends of rankings and popularity of musicians, bands and artists, including trend analysis of global ranking as well as trend analysis of rankings within particular niches and music genres.

An object of the present invention is to provide a Popularity Profiling System and Method that will provide a prediction of the future rankings and popularity of musicians, bands and artists, including a future global ranking as well as future rankings within particular niches and music genres.

Another object of the present invention is to provide a Popularity Profiling System and Method that will mathematically calculate rankings and popularity using a variety of criteria expressed numerically including criteria weighted by importance by multiplication with a value between (and inclusive of) 0 and 1.

Another object of the present invention is to provide a Popularity Profiling System and Method that will allow users to write reviews about bands, musicians and artists.

Another object of the present invention is to provide a Popularity Profiling System and Method that will allow users to download music from various bands, musicians and artists that are in the Ranking and Popularity Profiling System, and/or pay for these downloads.

Another object of the present invention is to provide a Popularity Profiling System and Method that will allow users to vote for bands and musicians and their songs, wherein the votes influence the popularity profiles of the bands and musicians.

Another object of the present invention is to provide a Popularity Profiling System and Method that will provide bands, musicians and artists with badges and widgets to display via their virtual and physical websites (or via Internet-connected devices), allowing their fans and listeners to vote for them.

Another object of the present invention is to provide a Popularity Profiling System and Method that will allow users to rate other users who post reviews about bands, musicians and artists, including a rating of the reviewers' content.

Another object of the present invention is to provide a Popularity Profiling System and Method that will allow bands, musicians and artists that are in the Ranking and Popularity Profiling System to give away their music as promotional offerings.

Another object of the present invention is to provide a Popularity Profiling System and Method that will provide bands, musicians and artists that are in the Ranking and Popularity Profiling System a way to view their ranking and popularity, and receive advice about how to increase and improve their ranking and popularity.

Another object of the present invention is to provide a Popularity Profiling System and Method that will provide contests to promote and improve the ranking and popularity for a band, musician or artist that is in the Ranking and Popularity Profiling System.

Another object of the present invention is to provide a Popularity Profiling System and Method that will predict which bands, musicians and artists will likely become commercially successful, or which exhibit a high potential for commercial success, based on ranking and popularity profile characteristics and trends.

Another object of the present invention is to provide a Popularity Profiling System and Method in which the Ranking and Popularity Profiling System can display the most popular reviewers, users, listeners and music enthusiasts.

Another object of the present invention is to provide a Popularity Profiling System and Method that will allow users to search for bands, musicians and artists in the Ranking and Popularity Profiling System, including a search by ranking, by popularity profile characteristics, by geographic location and/or by music genre.

Another object of the present invention is to provide a Popularity Profiling System and Method that will allow users to share their likes, preferences and favorite bands, musicians and artists that are in the system with their friends, acquaintances and others.

Another object of the present invention is to provide a Popularity Profiling System and Method that will allow bands, musicians and artists that are in the system to create surveys for their fans and listeners.

Another object of the present invention is to provide a Popularity Profiling System and Method that will provide a way for bands, musicians and artists to create surveys, including the creation of customized questions.

Another object of the present invention is to provide a Popularity Profiling System and Method that will allow bands, musicians and artists to post and publish their ranking and popularity characteristics.

Another object of the present invention is to provide a Popularity Profiling System and Method that will allow bands, musicians and artists to post and publish any surveys they create.

Another object of the present invention is to provide a Popularity Profiling System and Method that will allow users, fans, listeners and music enthusiasts to take surveys in blogs and websites from bands, musicians and artists in the system and allow that data to be collected for analysis by the system.

Another object of the present invention is to provide a Popularity Profiling System and Method that will show the ranking and popularity profile for bands, musicians and artists in some or all genres of music, even those genres yet to be discovered and named.

Another object of the present invention is to provide a Popularity Profiling System and Method that will show the ranking and popularity profile for bands, musicians and artists within geographic locations.

Another object of the present invention is to provide a Popularity Profiling System and Method that will show the ranking and popularity profile for bands, musicians and artists within categories based on demographic and/or socio-economic characteristics of music listeners and fans.

Another object of the present invention is to provide a Popularity Profiling System and Method that will provide account management tools for bands, musicians and artists to manage their information in the system.

Another object of the present invention is to provide a Popularity Profiling System and Method that will help bands and musicians to promote their music online, as well as through traditional marketing channels, in part by helping them to better understand the music market using rankings and popularity profiles of musicians and bands.

Another object of the present invention is to provide a Popularity Profiling System and Method that will provide to musicians, bands and other users a periodic notice of the ranking and popularity profile of musicians and bands as well as any change in their rankings and popularity profiles.

Another object of the present invention is to provide a Popularity Profiling System and Method that will allow users, fans, listeners and music enthusiasts to manage their information within the Ranking and Popularity Profiling System.

Another object of the present invention is to provide a Popularity Profiling System and Method which has mobile ability, including being accessible through mobile phones, PDAs and other mobile Internet based devices.

Another object of the present invention is to provide a Popularity Profiling System and Method that can display lists of popular categories, genres, music and songs, including those ranked based on the popularity profile of musicians and bands.

Another object of the present invention is to provide a Popularity Profiling System and Method that can perform sentiment analysis on textual input such as music reviews and blog posts in order to gauge the sentiment of the writer in regard to an artist or an artist's song(s).

It is intended that any other advantages and objects of the present invention that become apparent or obvious from the detailed description or illustrations contained herein are within the scope of the present invention.

What is claimed is:

1. A computer system for computing the popularity of one or more artists, comprising:
   one or more client computers;
   at least two information servers, wherein each information server contains or provides data related to one or more artists, and wherein at least one information server is accessible through the Internet;
   a popularity profile server (PPS) comprising:
      a qualitative data analyzer unit for automatically analyzing qualitative data using sentiment analysis, wherein the sentiment analysis uses natural language parsing to separate the qualitative data into parts of speech; and
      a score keeper unit for calculating a plurality of scores related to each of the one or more artists, the score keeper unit implementing computer instructions to:

(a) obtain two or more sets of data related to each artist from the at least two information servers, wherein the data comprises both qualitative data and quantitative data obtained from one or more sources other than search terms that were entered into an Internet search engine, and wherein each set of the two or more sets of data is obtained on different dates;

(b) automatically assign to each of the qualitative data based on a machine-based sentiment analysis of the qualitative data either a first number if the qualitative data analyzer classifies the quantitative data as a favorable sentiment of a song or a second number if the qualitative data analyzer classifies the quantitative data as an unfavorable sentiment of a song, wherein the qualitative data includes a published review of a song performed by the artist;

(c) calculate two or more sets of scores for each artist based on the quantitative data obtained and the number(s) assigned to the qualitative data, wherein each of the two or more sets of scores is comprised of one or more scores, and wherein each of the two or more sets of scores is calculated for each of the sets of data obtained by multiplying a weighting factor to each of the sets of data obtained and taking the sum of the respective products, the weighting factor being part of a set of weighting factors representing the relative importance of each set of data used to calculate a score and having a numerical value between 0 and 1 so that the sum of the set of weighting factors is equal to 1, and wherein the set of weighting factors is set by a user using a slider bar in a graphical user interface administered by the popularity profile server;

(d) calculate a momentum factor for each artist based on the rate of change over time of the two or more sets of scores calculated for the two or more sets of data, wherein the rate of change includes comparing a first score calculated from data obtained on a first date to a second score calculated from data obtained on a second date that is different than the first date; and (e) apply the momentum factor to all scores of the most recent of the two or more sets of scores to increase or decrease the values of the most recent of the two or more sets of scores;

one or more network interfaces connecting the popularity profile server, the one or more information servers, and the one or more client computers to a network;

a centralized database for storing all of the data obtained and the scores calculated;

a plurality of retrieval agents, each retrieval agent implementing computer instructions to obtain data from one of the at least two information servers in response to instructions communicated to the retrieval agent by an agent manager operating on the PPS, the data obtained comprising a subset of the data which is less than the whole of the data used to calculate a score, the instructions comprising a number N representing the maximum number of attempts to obtain the data for each task during a communications session, a number T representing a time period to wait, and an indicator of a portion of data available from the one of the at least two information servers that is different for each retrieval agent, the portion being less than the whole of the data available, wherein the number N, the number T, and the indicator are set for each retrieval agent by a user with administrative privileges using a graphical user interface administered by the PPS, wherein each retrieval agent does not attempt to obtain the data before the respective time period T has expired, wherein each retrieval agent obtains the data in accordance with the respective indicator, and wherein for each retrieval agent:
the retrieval agent determines whether the data is obtained successfully within the respective N attempts during the communications session, and if the data is obtained successfully within the respective N attempts during the communications session, the data retrieval agent requests permission from the agent manager to transfer the data obtained to the centralized database and transfers the data obtained to the centralized database only if permission is granted by the agent manager, but if the data is not obtained successfully after N attempts during the communication session, the data retrieval agent sends a failure message to the agent manager and terminates its own operation;

a maintenance agent implementing computer instructions to, in response to new data being added to the centralized database by any of the at least two retrieval agents: update one or more indexes related to the centralized database used to facilitate retrieval of data stored therein and cause the scorekeeper to calculate the two or more sets of scores for artists associated with the new data;

a widget agent implementing computer instructions on the PPS, to communicate with a remote third party application to receive a request from a remote third party application, the request comprising an identifier of an artist, wherein upon receiving the request, the widget agent retrieves from the centralized database the current ranking of the artist using the identifier and transmits the current ranking to the remote third party application, the current ranking representing the ranked order of the artist based on a comparison of the artist's current sets of scores to other artists' current sets of scores;

wherein the agent manager records in a log file after each data retrieval attempt by the plurality of retrieval agents an indicator of whether the data retrieval attempt was successful or not successful; and wherein at least one of the plurality of retrieval agents obtains the data by extracting the data directly from the HTML code of a web page viewable by a web browser or by receiving the data from a third party application that extracts the data from the HTML code of a web page viewable by a web browser.

2. The computer system of claim 1, wherein the computer instructions implemented by the popularity profile server for calculating a set of scores includes instructions for calculating the two or more sets of scores for each information server from which data is obtained for an artist, whereby the two or more sets of scores for each information source is not based on data obtained from other information sources.

3. The computer system of claim 1, wherein the computer instructions implemented by the popularity profile server for calculating the two or more sets of scores includes instructions for calculating the two or more sets of scores for each category of the two or more sets of categories by which the obtained data is classified.

4. The computer system of claim 1, wherein obtaining the two or more sets of data involves obtaining an initial set of data and obtaining a subsequent set of data after an interval of time passes; and storing some or all of the obtained data in the centralized database.

5. The computer system of claim 1, wherein the popularity profile server further comprises computer instructions for:
assigning to an artist a number indicating the ranked order of the artist based on a comparison of the artist's set of scores to other artists' set of scores; and
storing the number in the centralized database in association with the artist.

6. The computer system of claim 1, wherein the popularity profile server further comprises computer instructions for:
generating a list of a plurality of artists in ranked order based on a comparison of the artists' set of scores to one another.

7. The computer system of claim 1, wherein the popularity profile server transfers information to a client computer, and wherein the information transferred includes: some or all of the data obtained, or a set of scores, or a combination thereof.

8. A computer implemented method for computing the popularity of one or more artists, comprising:
obtaining by a plurality of retrieval agents two or more sets of data related to each artist from at least two information servers, with one of the at least two information servers having data obtainable through the Internet, wherein the data comprises both qualitative data and quantitative data obtained from one or more sources other than search terms that were entered into an Internet search engine, wherein each set of the two or more sets of data is obtained on different dates,
wherein each of the plurality of retrieval agents obtains data from one of the at least two information servers in response to instructions communicated to the retrieval agent by an agent manager, the data obtained comprising a subset of the data which is less than the whole of the data used to calculate a score, the instructions comprising a number N representing the maximum number of attempts to obtain the data during a communications session, a number T representing a time period to wait, and an indicator of a portion of data available from the one of the at least two information servers that is different for each retrieval agent, the portion being less than the whole of the data available,
wherein the number N, the number T, and the indicator are set for each retrieval agent by a user with administrative privileges using a graphical user interface administered by the PPS,
wherein each retrieval agent does not attempt to obtain the data before the respective time period T has expired,
wherein each retrieval agent obtains data in accordance with the respective indicator; and
wherein for each retrieval agent:
the retrieval agent determines whether the data is obtained successfully within the respective N attempts during the communications session, and if the data is obtained successfully within the respective N attempts during the communications session, the data retrieval agent requests permission from the agent manager to transfer the data obtained to a centralized database and transfers the data obtained to the centralized database only if permission is granted by the agent manager, but if the data is not obtained successfully after N attempts during the communication session, the data retrieval agent sends a failure message to the agent manager and terminates its own operation;
assigning to each of the qualitative data one of two predetermined numbers based on a machine-based sentiment analysis of the qualitative data, wherein the sentiment analysis uses natural language parsing to separate the qualitative data into parts of speech, and wherein the number assigned is a first number if the sentiment analysis classifies the quantitative data as a favorable sentiment of a song and a second number if the sentiment analysis classifies the quantitative data as an unfavorable sentiment of a song, wherein the qualitative data includes a published review of a song performed by the artist;
calculating two or more sets of scores for each artist based on quantitative data obtained and the number(s) assigned to the qualitative data, wherein each of the two or more sets of scores is comprised of one or more scores, and wherein each of the two or more sets of scores is calculated for each of the sets of data obtained,
wherein each of the scores is calculated by multiplying a weighting factor to each of the sets of data obtained and taking the sum of the respective products, the weighting factor being part of a set of weighting factors representing the relative importance of each set of data used to calculate a score and having a numerical value between 0 and 1 so that the sum of the set of weighting factors is equal to 1, and wherein the set of weighting factors is set by a user using a slider bar in a graphical user interface administered by the popularity profile server;
calculating a momentum factor for each artist based on the rate of change over time of the two or more sets of scores calculated for the two or more sets of data, wherein the rate of change includes comparing a first score calculated from data obtained on a first date to a second score calculated from data obtained on a second date that is different than the first date;
applying the momentum factor to all scores of the most recent of the two or more sets of scores to increase or decrease the values of the most recent of the two or more sets of scores;
updating one or more indexes used to facilitate retrieval of data stored in the centralized database in response to the two or more sets of data obtained from the at least two information servers being added to the centralized database by any of the at least two retrieval agents;
causing the two or more sets of scores to be calculated in response to the two or more sets of data obtained from the at least two information servers being added to the centralized database by any of the at least two retrieval agents;
retrieving from the centralized database the current ranking of the artist using an identifier of an artist and transmitting the current ranking to a remote third party application in response to receiving a request from the remote third party application, the request comprising the identifier of the artist, and the current ranking representing the ranked order of the artist based on a comparison of the artist's current sets of scores to other artists' current sets of scores;
logging by the agent manager in a log file after each data retrieval attempt by the plurality of retrieval agents an indicator of whether the data retrieval attempt was successful or not successful; and
wherein at least one of the plurality of retrieval agents obtains the data by extracting the data directly from the HTML code of a web page viewable by a web browser or by receiving the data from a third party application that extracts the data from the HTML code of a web page viewable by a web browser.

9. The computer implemented method of claim 8, wherein calculating a two or more sets of scores includes calculating the two or more sets for each information server from which data is obtained for an artist, whereby the two or more sets of scores for each information source is not based on data obtained from other information sources.

10. The computer implemented method of claim 8, wherein calculating a the two or more sets of scores includes calculating the two or more sets for each category of a set of categories by which the obtained data is classified.

11. The computer implemented method of claim 8, wherein obtaining data includes:
   obtaining the two or more sets of data involves obtaining an initial set of data and obtaining a subsequent set of data after an interval of time passes; and
   storing some or all of the obtained data in the centralized database.

12. The computer implemented method of claim 8, further comprising:
   assigning to an artist a number indicating the ranked order of the artist based on a comparison of the artist's set of scores to other artists' set of scores; and
   storing the number in the centralized database in association with the artist.

13. The computer implemented method of claim 8, further comprising:
   generating a list of a plurality of artists in ranked order based, on a comparison of the artists' set of scores to one another.

14. The computer implemented method of claim 8, further comprising:
   transferring information over a computer network, wherein the information transferred includes: some or all of the data obtained, or a set of scores, or a combination thereof.

* * * * *